US012615617B2

(12) United States Patent
Yerramalli et al.

(10) Patent No.: US 12,615,617 B2
(45) Date of Patent: Apr. 28, 2026

(54) METHODS FOR BROADCASTING MULTIPLE POSITIONING CONFIGURATIONS

(71) Applicant: QUALCOMM Incorporated, San Diego, CA (US)

(72) Inventors: Srinivas Yerramalli, San Diego, CA (US); Mukesh Kumar, Hyderabad (IN); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 363 days.

(21) Appl. No.: 18/558,432

(22) PCT Filed: May 24, 2022

(86) PCT No.: PCT/US2022/030662
§ 371 (c)(1),
(2) Date: Nov. 1, 2023

(87) PCT Pub. No.: WO2023/282986
PCT Pub. Date: Jan. 12, 2023

(65) Prior Publication Data
US 2024/0244576 A1     Jul. 18, 2024

(30) Foreign Application Priority Data
Jul. 7, 2021     (GR) ............................... 20210100457

(51) Int. Cl.
| | |
|---|---|
| *H04W 64/00* | (2009.01) |
| *H04L 5/00* | (2006.01) |
| *H04W 48/10* | (2009.01) |

(52) U.S. Cl.
CPC ......... *H04W 64/006* (2013.01); *H04L 5/0048* (2013.01); *H04W 48/10* (2013.01)

(58) Field of Classification Search
None
See application file for complete search history.

(56) References Cited

U.S. PATENT DOCUMENTS

| | | | | |
|---|---|---|---|---|
| 10,218,471 B1 * | 2/2019 | Kumar | ................ | H04L 27/2601 |
| 2011/0081917 A1 * | 4/2011 | Frank | .................... | H04W 64/00 |
| | | | | 455/456.1 |

(Continued)

FOREIGN PATENT DOCUMENTS

| | | | | | |
|---|---|---|---|---|---|
| CN | 113316164 A | * | 8/2021 | ............ | H04W 64/00 |
| WO | WO-2017078595 A1 | * | 5/2017 | ............ | H04W 72/23 |

(Continued)

OTHER PUBLICATIONS

CATT: "Consideration on Mechanism of SI Broadcasting for Positioning", 3GPP TSG-RAN WG2 Meeting #107, R2-1908998, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 16, 2019, 4 Pages, XP051766813, paragraph [0002].

(Continued)

*Primary Examiner* — Andrew C Oh
(74) *Attorney, Agent, or Firm* — SUNSTEIN LLP

(57) ABSTRACT

Techniques are discussed herein for providing multiple positioning reference signal (PRS) configurations to a user equipment (UE). An example method for measuring a positioning reference signal includes receiving positioning assistance data including a first portion of a plurality of positioning reference signal configurations and scheduling information for a second portion of the plurality of positioning reference signal configurations, selecting a first positioning reference signal configuration based on the first portion of the plurality of positioning reference signal configurations, obtaining a plurality of positioning reference (Continued)

signal parameters associated with the first positioning reference signal configuration based on the scheduling information, wherein the plurality of positioning reference signal parameters are included in the second portion of the plurality of positioning reference signal configurations, and measuring one or more positioning reference signals, the one or more positioning reference signals being based at least in part on the plurality of positioning reference signal parameters.

30 Claims, 13 Drawing Sheets

(56) References Cited

U.S. PATENT DOCUMENTS

| | | | |
|---|---|---|---|
| 2018/0048444 A1 * | 2/2018 | Park | H04L 27/2613 |
| 2019/0053280 A1 * | 2/2019 | Rico Alvarino | H04L 5/0048 |
| 2020/0053690 A1 * | 2/2020 | Fischer | G01S 19/05 |
| 2022/0030544 A1 * | 1/2022 | Zhou | H04L 25/0226 |
| 2022/0361141 A1 * | 11/2022 | Kumar | H04W 4/029 |
| 2024/0163830 A1 * | 5/2024 | Li | H04W 64/00 |
| 2024/0244576 A1 * | 7/2024 | Yerramalli | H04W 64/006 |

FOREIGN PATENT DOCUMENTS

| | | | | |
|---|---|---|---|---|
| WO | WO-2020068310 A1 * | 4/2020 | | G01S 5/0018 |
| WO | WO-2021045565 A1 * | 3/2021 | | H04L 5/0069 |
| WO | WO-2021075851 A1 * | 4/2021 | | H04W 4/40 |
| WO | WO-2022000200 A1 * | 1/2022 | | H04W 64/00 |
| WO | WO-2022010626 A1 * | 1/2022 | | H04W 72/12 |
| WO | WO-2022120611 A1 * | 6/2022 | | H04W 24/08 |
| WO | WO-2022155930 A1 * | 7/2022 | | H04W 64/00 |
| WO | WO-2022238080 A1 * | 11/2022 | | G01S 5/0236 |

OTHER PUBLICATIONS

ERICSSON: "Scheduling and Acquisition of SI Messages Containing Positioning SIBs", 3GPP TSG-RAN WG2 #103, R2-1812419, 3rd Generation Partnership Project (3GPP), Mobile Competence Centre, 650, Route Des Lucioles, F-06921 Sophia-Antipolis Cedex, France, vol. RAN WG2, No. Gothenburg, Sweden, Aug. 20, 2018-Aug. 24, 2018, Aug. 10, 2018, 14 Pages, XP051522017, paragraph [6.3.1].

International Search Report and Written Opinion—PCT/US2022/030662—ISA/EPO—Oct. 11, 2022.

* cited by examiner

700

900

| Parameters | UE-Initiated | LMF-Initiated |
|---|---|---|
| DL-PRS Start Time and Duration | Yes | Yes |
| Desired Number of TRPs | Yes | No |
| SSB Configuration for requested TRPs | Yes | No |
| Desired Beam Direction | Yes | No |
| CHOICE A: Pre-defined Configuration: | | |
| DL-PRS Configuration Identifier | Yes | Yes |
| CHOICE B: DL-PRS Configuration Parameter: | | |
| Maximum Number of Frequency Layers | Yes | Yes |
| DL-PRS Positioning Frequency Layer Information: | | |
| DL-PRS Subcarrier Spacing | No | No |
| DL-PRS Resource Bandwidth | Yes | Yes |
| DL-PRS Start PRB | No | No |
| DL-PRS PointA | No | No |
| DL-PRS Comb Size N | No | Yes |
| DL-PRS Cyclic Prefix | No | No |
| DL-PRS Configuration per Frequency Layer: | | |
| DL-PRS ID / PCI, ARFCN / NCGI | Yes | No |
| Maximum Number of DL-PRS Resource Sets | Yes | Yes |
| DL-PRS Resource Set Information: | | |
| DL-PRS Resource Set ID | Yes | Yes |
| DL-PRS Periodicity and Resource Set Slot Offset | Yes | Yes |
| DL-PRS Resource Repetition Factor | Yes | Yes |
| DL-PRS Resource Time Gap | Yes | Yes |
| DL-PRS Number of Symbols | Yes | Yes |
| DL-PRS Muting Option 1 | No | Yes |
| DL-PRS Muting Option 2 | No | Yes |
| DL-PRS Resource Power | No | Yes |
| Maximum Number of DL-PRS Resources per Set | Yes | Yes |
| DL-PRS Resource Information: | | |
| DL-PRS Resource ID | Yes | Yes |
| DL-PRS Sequence ID | No | Yes |
| DL-PRS RE Offset | No | Yes |
| DL-PRS Resource Slot Offset | No | Yes |
| DL-PRS Resource Symbol Offset | No | Yes |
| DL-PRS QCL-Info | Yes | Yes |

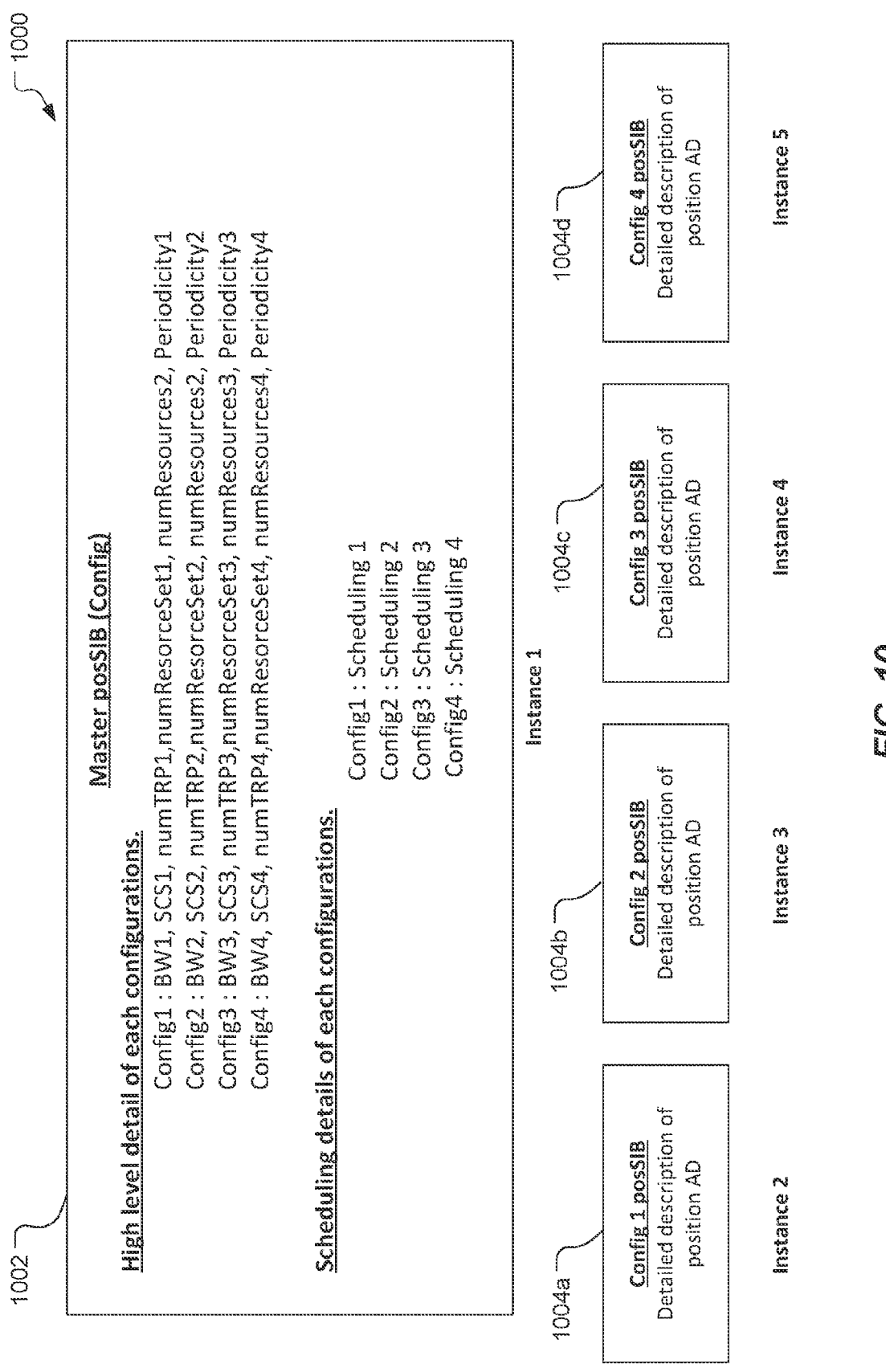

1000

1002

Master posSIB (Config)

High level detail of each configurations.

Config1 : BW1, SCS1, numTRP1,numResorceSet1, numResources2, Periodicity1
    Config2 : BW2, SCS2, numTRP2,numResorceSet2, numResources2, Periodicity2
    Config3 : BW3, SCS3, numTRP3,numResorceSet3, numResources3, Periodicity3
    Config4 : BW4, SCS4, numTRP4,numResorceSet4, numResources4, Periodicity4

Scheduling details of each configurations.

Config1 : Scheduling 1
    Config2 : Scheduling 2
    Config3 : Scheduling 3
    Config4 : Scheduling 4

Instance 1

1004a

Config 1 posSIB
Detailed description of position AD

Instance 2

1004b

Config 2 posSIB
Detailed description of position AD

Instance 3

1004c

Config 3 posSIB
Detailed description of position AD

Instance 4

1004d

Config 4 posSIB
Detailed description of position AD

Instance 5

FIG. 10

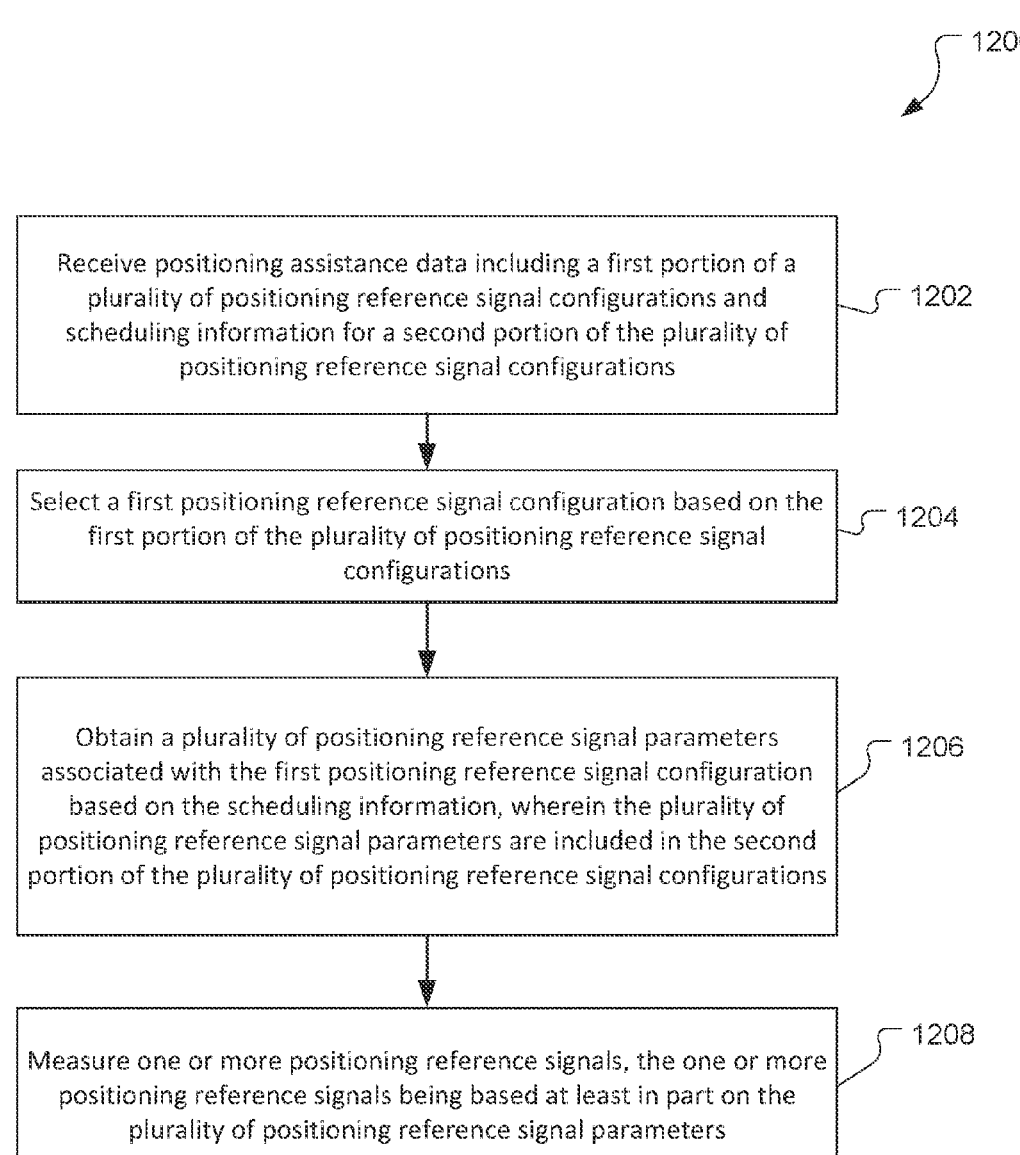

1200

Receive positioning assistance data including a first portion of a plurality of positioning reference signal configurations and scheduling information for a second portion of the plurality of positioning reference signal configurations

1202

Select a first positioning reference signal configuration based on the first portion of the plurality of positioning reference signal configurations

1204

Obtain a plurality of positioning reference signal parameters associated with the first positioning reference signal configuration based on the scheduling information, wherein the plurality of positioning reference signal parameters are included in the second portion of the plurality of positioning reference signal configurations

1206

Measure one or more positioning reference signals, the one or more positioning reference signals being based at least in part on the plurality of positioning reference signal parameters

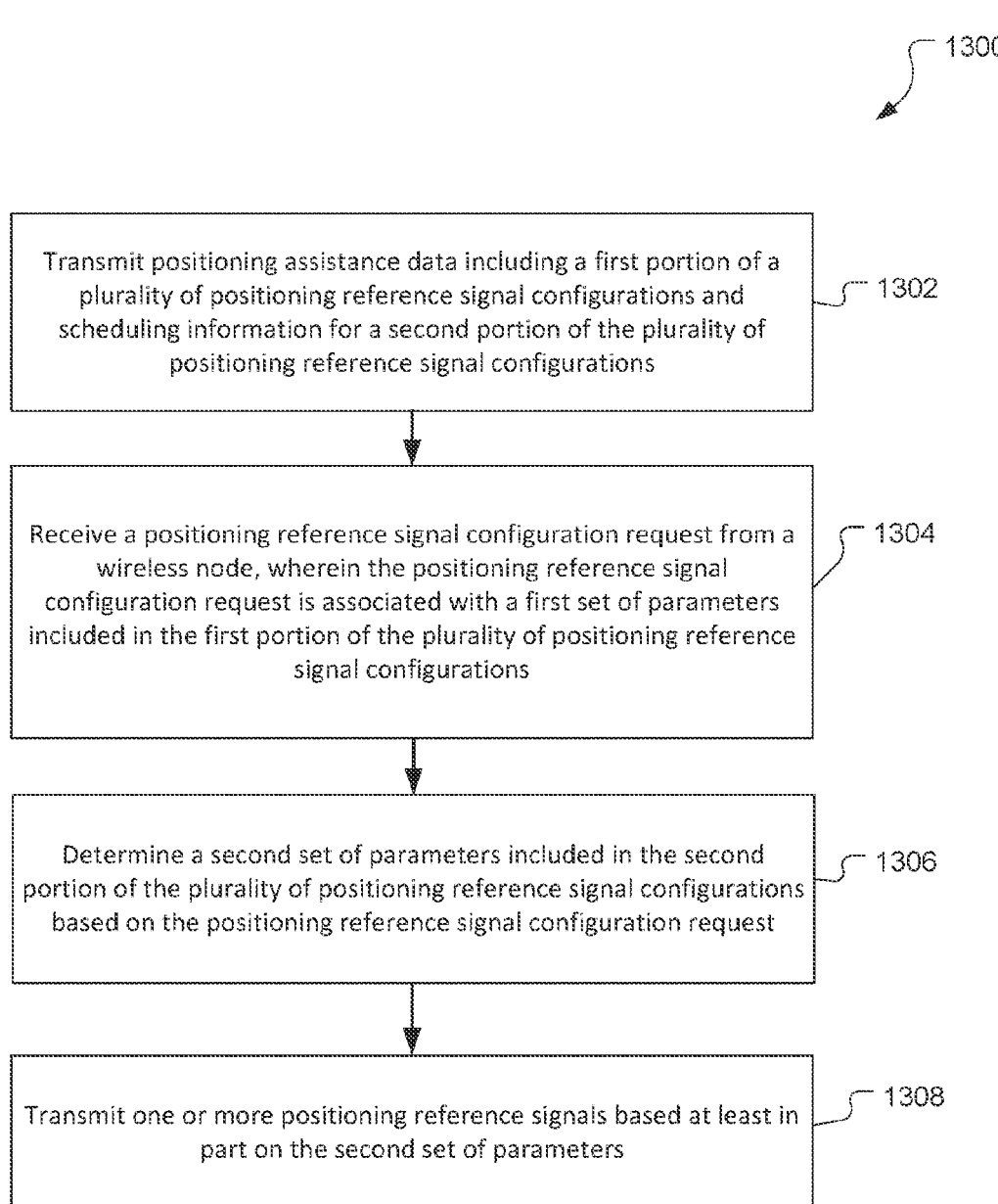

1300

Transmit positioning assistance data including a first portion of a plurality of positioning reference signal configurations and scheduling information for a second portion of the plurality of positioning reference signal configurations ⟋⟍ 1302

Receive a positioning reference signal configuration request from a wireless node, wherein the positioning reference signal configuration request is associated with a first set of parameters included in the first portion of the plurality of positioning reference signal configurations ⟋⟍ 1304

Determine a second set of parameters included in the second portion of the plurality of positioning reference signal configurations based on the positioning reference signal configuration request ⟋⟍ 1306

Transmit one or more positioning reference signals based at least in part on the second set of parameters ⟋⟍ 1308

*FIG. 13*

METHODS FOR BROADCASTING MULTIPLE POSITIONING CONFIGURATIONS

CROSS-REFERENCE TO RELATED APPLICATION

This application is the National Stage of International Application No. PCT/US2022/030662, filed May 24, 2022, entitled "METHODS FOR BROADCASTING MULTIPLE POSITIONING CONFIGURATIONS," which claims the benefit of Greek patent application No. 20210100457, filed Jul. 7, 2021, entitled "METHODS FOR BROADCASTING MULTIPLE POSITIONING CONFIGURATIONS," both of which are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. Stations in a wireless network may be configured to transmit reference signals to enable mobile device to perform positioning measurements. Improvements in position related signaling may improve the efficiency of mobile devices.

SUMMARY

An example method for measuring a positioning reference signal according to the disclosure includes receiving positioning assistance data including a first portion of a plurality of positioning reference signal configurations and scheduling information for a second portion of the plurality of positioning reference signal configurations, selecting a first positioning reference signal configuration based on the first portion of the plurality of positioning reference signal configurations, obtaining a plurality of positioning reference signal parameters associated with the first positioning reference signal configuration based on the scheduling information, wherein the plurality of positioning reference signal parameters are included in the second portion of the plurality of positioning reference signal configurations, and measuring one or more positioning reference signals, the one or more positioning reference signals being based at least in part on the plurality of positioning reference signal parameters.

Implementations of such a method may include one or more of the following features. The positioning assistance data including the first portion of the plurality of positioning reference signal configurations and the scheduling information for the second portion of the plurality of positioning reference signal configurations may be included in a system information block in one or more radio resource control messages. The plurality of positioning reference signal parameters may be included in one or more system information blocks in one or more radio resource control messages. The plurality of positioning reference signal parameters associated with one of the plurality of positioning reference signal configurations may be included in one system information block in one or more radio resource control messages. A data payload for the first portion of the plurality of positioning reference signal configurations and the scheduling information may be less than a data payload for the plurality of positioning reference signal parameters. The first portion of the plurality of positioning reference signal configurations may include a bandwidth value and a subcarrier spacing value for each of the plurality of positioning reference signal configurations. An on-demand positioning reference signal request may be transmitted based on the first positioning reference signal configuration. The on-demand positioning reference signal request may be included in a mobile-originated location request. Measuring the one or more positioning reference signals may include determining one or more of a Received Signal Strength Indication (RSSI), a Round Trip signal propagation Time (RTT), a Reference Signal Time Difference (RSTD), a Receive-minus-Transmit Time Difference (Rx-Tx Time Difference), a Reference Signal Received Power (RSRP), and a Reference Signal Received Quality (RSRQ) based on the one or more positioning reference signals.

An example method for transmitting positioning reference signals according to the disclosure includes transmitting positioning assistance data including a first portion of a plurality of positioning reference signal configurations and scheduling information for a second portion of the plurality of positioning reference signal configurations, receiving a positioning reference signal configuration request from a wireless node, wherein the positioning reference signal configuration request is associated with a first set of parameters included in the first portion of the plurality of positioning reference signal configurations, determining a second set of parameters included in the second portion of the plurality of positioning reference signal configurations based on the positioning reference signal configuration request, and transmitting one or more positioning reference signals based at least in part on the second set of parameters.

Implementations of such a method may include one or more of the following features. Transmitting the positioning assistance data may include transmitting a plurality of system information blocks in one or more radio resource control messages. The first portion of the plurality of positioning reference signal configurations and the scheduling information may be included in a single system information block. At least one of the plurality of system information blocks may include the second set of parameters. The second set of parameters may be included in the plurality of system information blocks. The first portion of the plurality of positioning reference signal configurations may include a bandwidth value and a subcarrier spacing value for each of the plurality of positioning reference signal configurations. The positioning reference signal configuration request may be an on-demand positioning reference signal request. The on-demand positioning reference signal request may be included in a mobile-originated location request.

An example apparatus according to the disclosure includes a memory, at least one transceiver, at least one processor communicatively coupled to the memory and the at least one transceiver, and configured to receive positioning assistance data including a first portion of a plurality of positioning reference signal configurations and scheduling information for a second portion of the plurality of positioning reference signal configurations, select a first positioning reference signal configuration based on the first portion of the plurality of positioning reference signal configurations, obtain a plurality of positioning reference signal parameters associated with the first positioning reference signal configuration based on the scheduling information, wherein the plurality of positioning reference signal parameters are included in the second portion of the plurality of positioning reference signal configurations, and measure one or more positioning reference signals, the one or more positioning reference signals being based at least in part on the plurality of positioning reference signal parameters.

An example apparatus according to the disclosure includes a memory, at least one transceiver, at least one processor communicatively coupled to the memory and the at least one transceiver, and configured to transmit positioning assistance data including a first portion of a plurality of positioning reference signal configurations and scheduling information for a second portion of the plurality of positioning reference signal configurations, receive a positioning reference signal configuration request from a wireless node, wherein the positioning reference signal configuration request is associated with a first set of parameters included in the first portion of the plurality of positioning reference signal configurations, determine a second set of parameters included in the second portion of the plurality of positioning reference signal configurations based on the positioning reference signal configuration request, and transmit one or more positioning reference signals based at least in part on the second set of parameters.

Items and/or techniques described herein may provide one or more of the following capabilities, as well as other capabilities not mentioned. A communications network may provide assistance data including reference signal information to user equipment. The user equipment may request reference signals based on configuration parameters. The assistance data may be included in a plurality of system information blocks. A first system information block may contain high level descriptions for a plurality of reference signal configurations. Additional system information blocks may include configuration details for the reference signal configurations. The first system information block may include scheduling information to enable the user equipment to efficiently decode the configuration details for a selected reference signal configuration. The reference signal configurations may be used for on-demand reference signal requests. The resources required to decode reference signal configurations may be decreased. Latencies associated with reference signaling based positioning may be reduced. Other capabilities may be provided and not every implementation according to the disclosure must provide any, let alone all, of the capabilities discussed.

BRIEF DESCRIPTION OF THE DRAWINGS

FIG. 9 is an example data structure for requested downlink positioning reference signal configuration information.

FIG. 10 includes an example data structure for broadcasting multiple positioning configurations.

FIG. 12 is a process flow of an example method for measuring a positioning reference signal.

FIG. 13 is a process flow of an example method for transmitting positioning reference signals.

DETAILED DESCRIPTION

Figure 1:
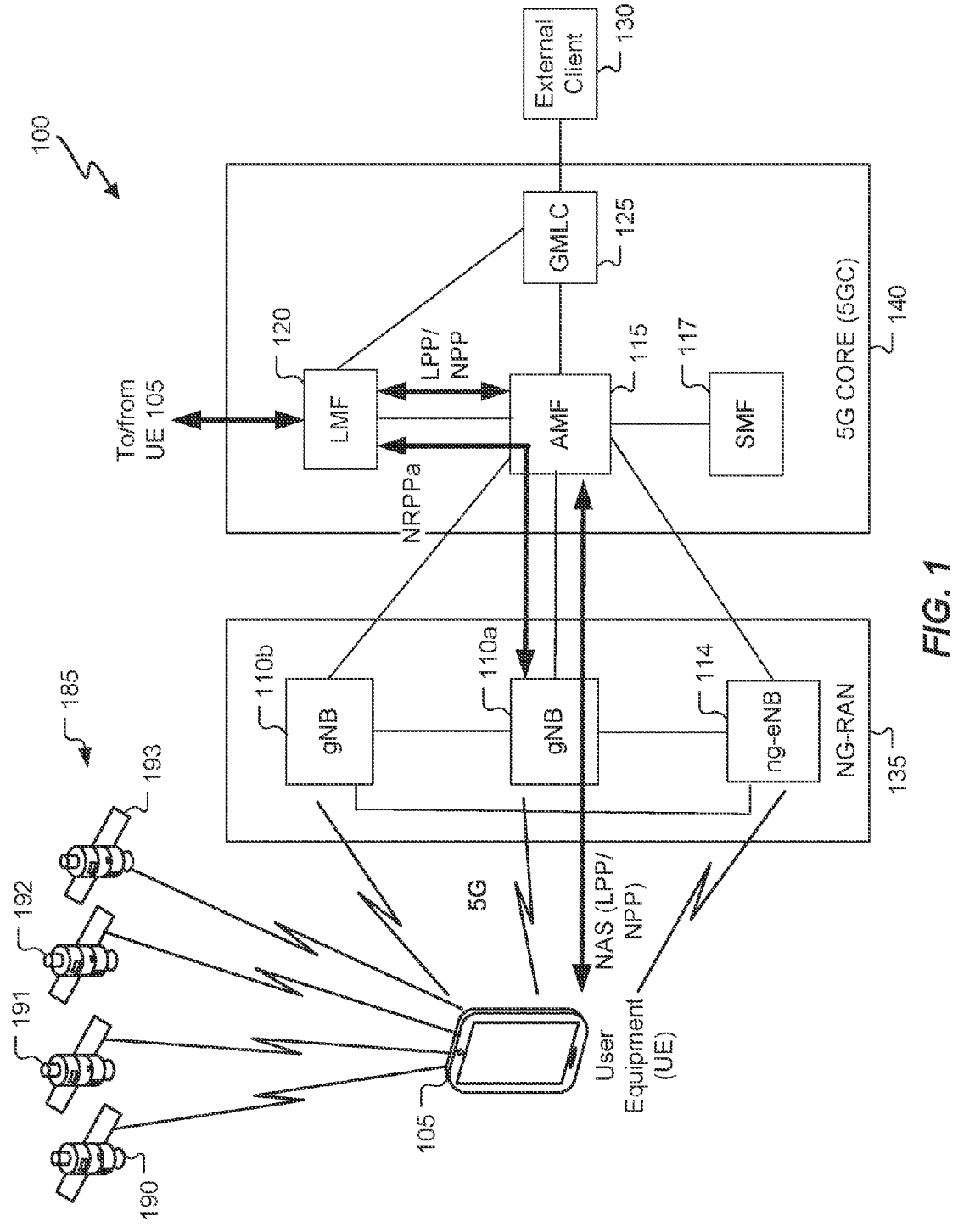
FIG. 1 is a simplified diagram of an example wireless communications system.

Techniques are discussed herein for providing multiple positioning reference signal (PRS) configurations to a user equipment (UE). Prior implementations of Downlink (DL) PRS transmissions are typically in an "always-on" configuration such that a base station will transmit PRS regardless of the requirements of the UEs in the network. Such an "always-on" configuration may utilize scarce resources such as bandwidth, energy, as well as require unnecessary overhead when UE positioning is not required during a particular time or in a particular area of a network. In networks which utilize beamformed DL-PRS transmissions (e.g., 5G NR), the DL-PRS transmissions in all beam sweeping directions may result in unnecessary transmissions of DL-PRSs. The "always-on" configuration may also utilize static allocation of DL-PRS resources. In general, a static DL-PRS resource allocation does not allow for temporary increases of the DL-PRS resources to realize higher positioning accuracy and/or lower latency positioning requirements in certain areas or at certain times. Similarly, the static allocation of DL-PRS resources does not allow for a decrease of DL-PRS resources in case the positioning requirements can be met with fewer DL-PRS resources.

The on-demand DL-PRS techniques utilized herein enable a network to change the DL-PRS resource allocation dynamically as required (e.g., based on the requirements for a particular use case or application). In an example, the on-demand DL-PRS techniques may enable a network to dynamically vary configuration parameters such as a DL-PRS occasion periodicity, a duration of the DL-PRS occasions, a DL-PRS bandwidth, and a DL-PRS spatial direction. Some prior implementations of PRS based positioning utilize positioning System Information Blocks (posSIBs) to provide PRS configuration information to the UEs in a coverage area. For example, the network nodes (e.g., gNBs) may be configured to broadcast different sets of PRS configurations which are supported by the network. In general, the posSIBs may be relatively large data structures and may be prone to decode errors particularly at cell boundaries. In the prior implementations, the UE may be required to decode each of the PRS related posSIBs provided by the network and then decide which PRS configuration to utilize in an on-demand positioning session. Decoding all of the posSIBs associated with the multiple positioning configurations may increase decode errors and positioning latency, as well as increase the power consumption of the UE.

The techniques provided herein utilized an improved broadcast scheme for multiple positioning configurations. In an embodiment, each PRS configuration may be bifurcated into two parts including a first part with a relatively small data payload including a high level description of the PRS configuration, and a second part including a relatively larger data payload with PRS configuration information elements and details. In an example, the first part may be included in a master posSIB which includes definitions for a plurality of PRS configurations. The master posSIB may also include scheduling information for a plurality of respective second parts containing the PRS configuration information associated with the first parts. Thus, a UE may decode the relatively small master posSIB to select a PRS configuration, and then decode only the second part associated with the selected PRS configuration.

In operation, a UE may receive posSIBs and read only the master posSIB to select one of the multiple PRS configurations based on the high level description and other information included in the master posSIB (e.g., Part 1). The UE may send an assistance data activation request based on the selected PRS configuration and receive a response from a network server, such as a Location Management Function (LMF), confirming the request. The UE may then read a posSIB for the second part (e.g., Part 2) based on the scheduling information included in Part 1. The UE may initiate the request in advance to avoid delays in reading the possSIB for the Part 2 information. The UE may initiate an on-demand request based on the selected PRS configuration (e.g., the Part 1 and Part 2 information elements). In the case where the UE does not prefer any of the configurations included in the master posSIB, the UE may skip decoding the remaining posSIBs and define a PRS configuration in a request for assistance data. These techniques and configurations are examples, and other techniques and configurations may be used.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*. 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-cNBs. The ng-cNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs 110*a*, 110*b*. 114 may each comprise one or more TRPs. For example, each sector within a cell of a BS may comprise a TRP, although multiple TRPs may share one or more components (e.g., share a processor but have separate antennas). The system 100 may include macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platfom (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110a, 110b and/or the ng-cNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355 or TS 37.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-cNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), UE Receive-minus-Transmit Time Difference (Rx-Tx Time Difference), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-cNB 114) or APs may obtain location measurements (e.g., measurements of RSSI, RTT, Rx-Tx Time Difference, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS). WLAN. E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 15. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs. WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
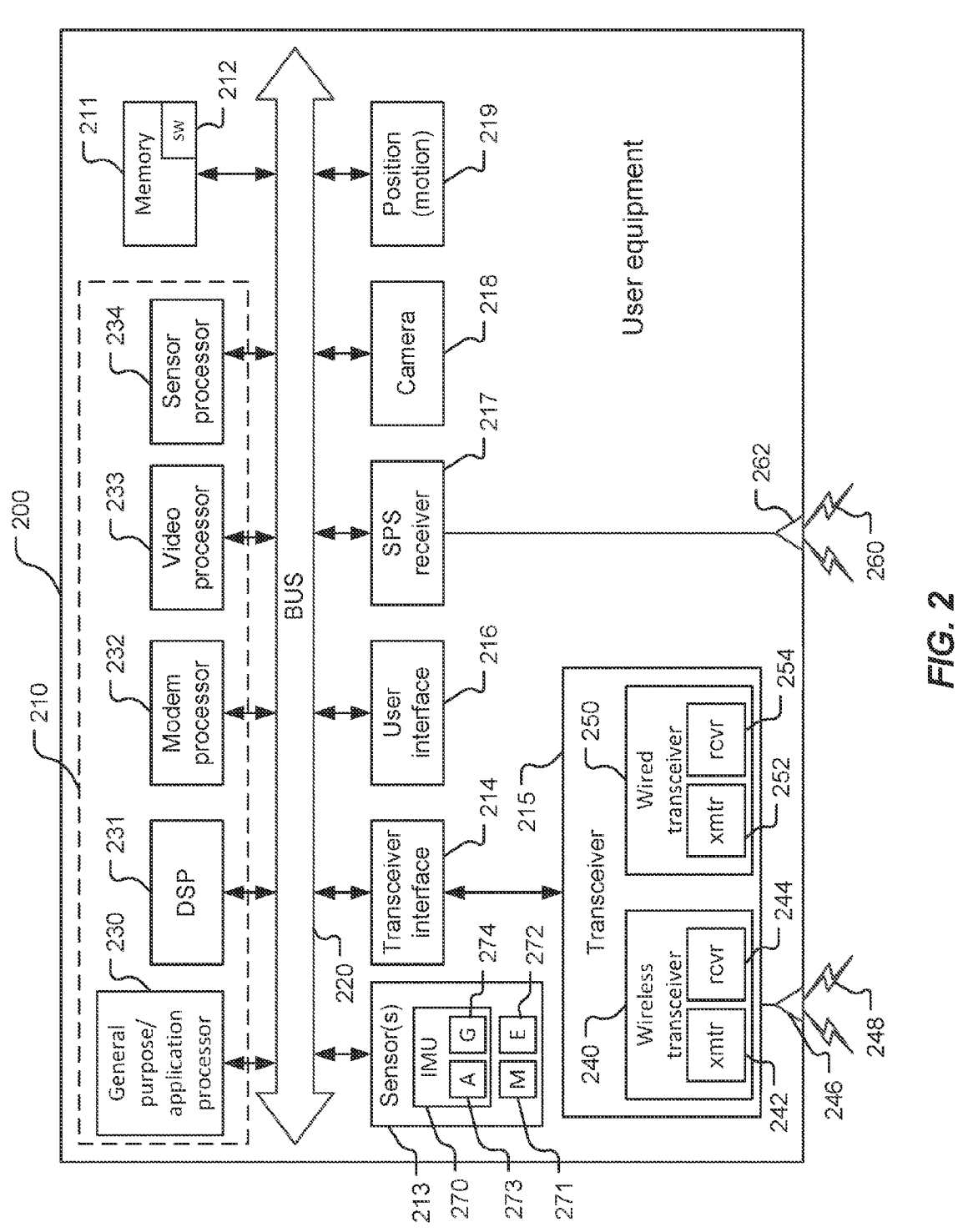
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver and a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing (with one or more wireless signals transmitted and reflection(s) used to identify, map and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA). LTE (Long-Term Evolution), LTE Direct (LTE-D), 3GPP LTE-V2X (PC5), V2C (Uu), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6 GHz and/or 100 GHz and higher (e.g., FR2x, FR3, FR4). The wired transceiver 250 may include a transmitter 252 and a receiver 254 configured for wired communication, e.g., with the network 135 to send communications to, and receive communications from, the gNB 110*a*, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
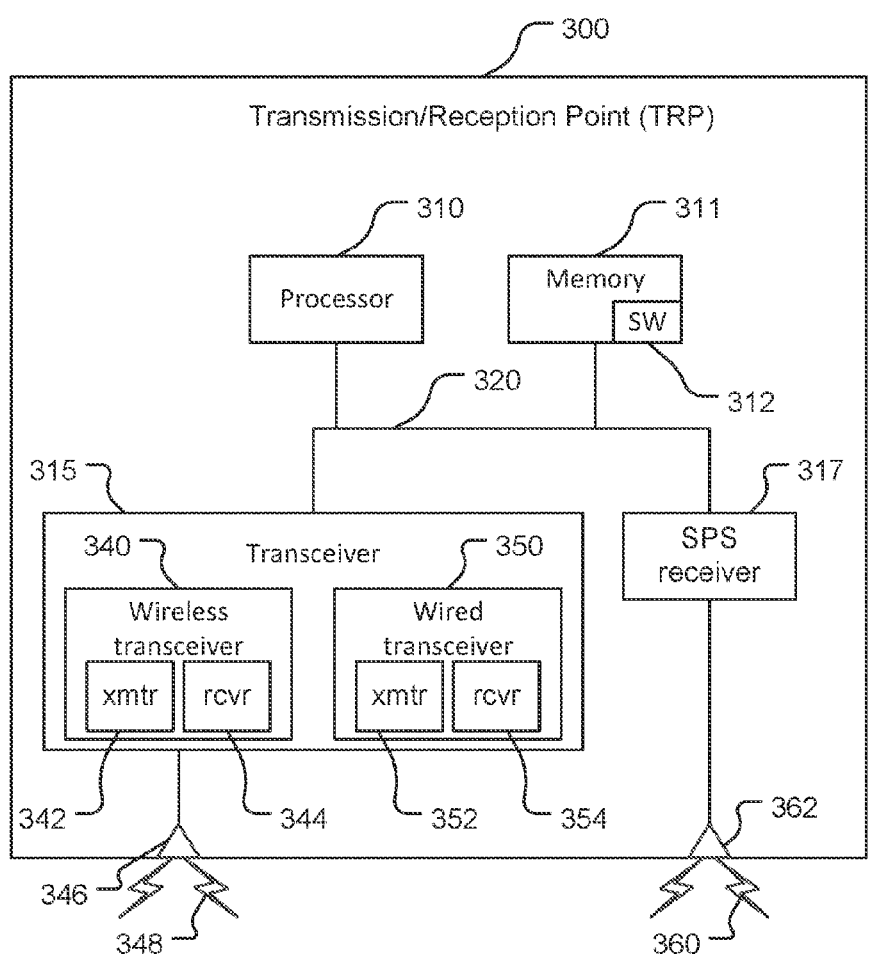
FIG. 3 is a block diagram of components of an example transmission/reception point shown in FIG. 1.

Referring also to FIG. 3, an example of a TRP 300 of the BSs 110a. 110b, 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a nontransitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
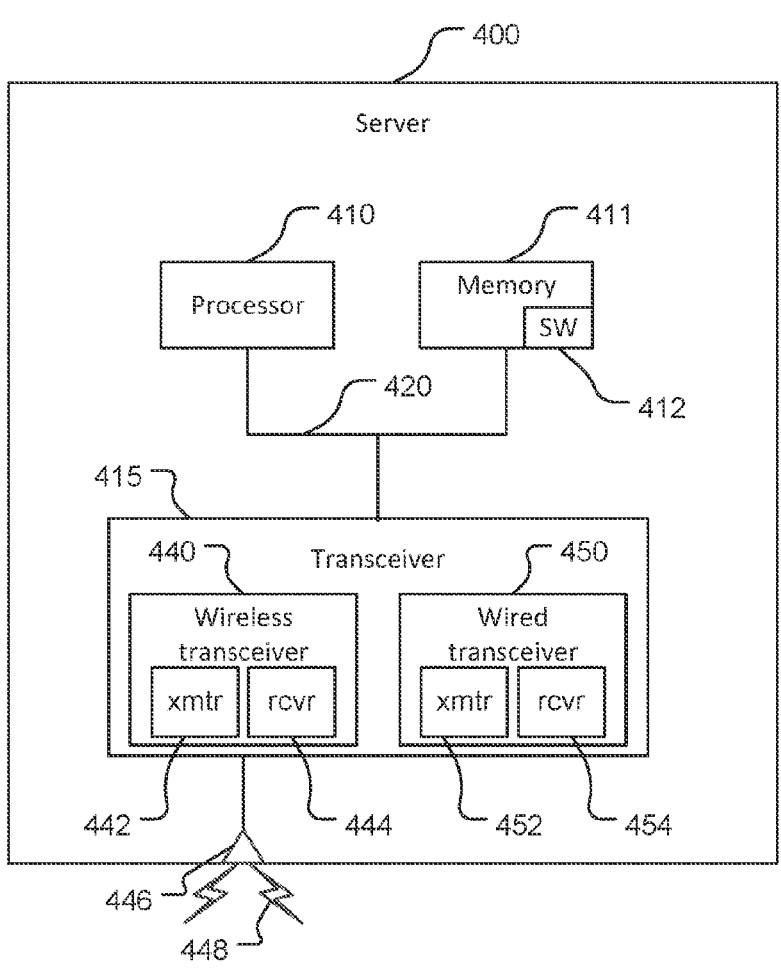
FIG. 4 is a block diagram of components of an example server shown in FIG. 1.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution). LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figures 5A, 5B:
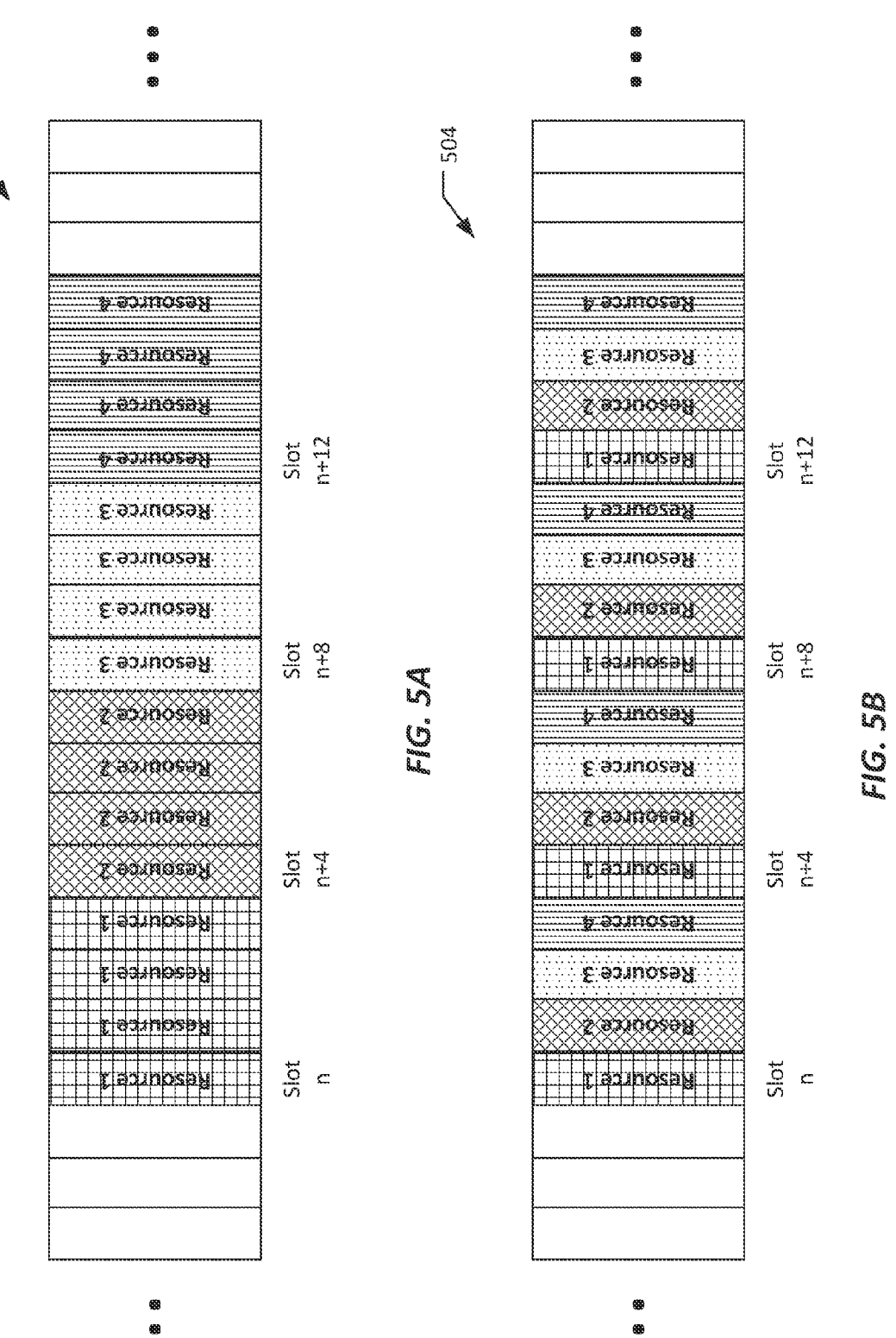
FIGS. 5A and 5B illustrate example downlink positioning reference signal resource sets.

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
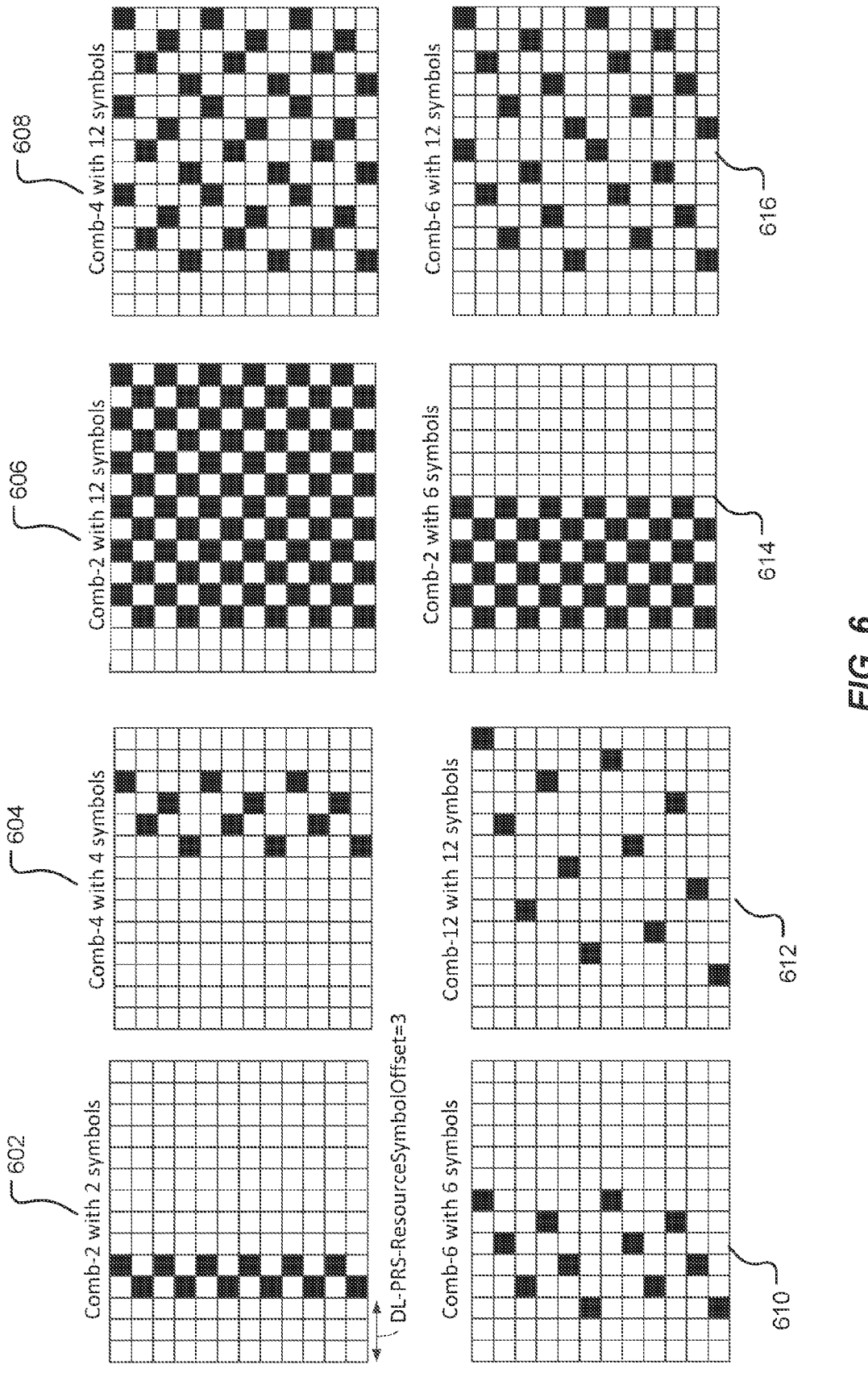
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

Figure 7:
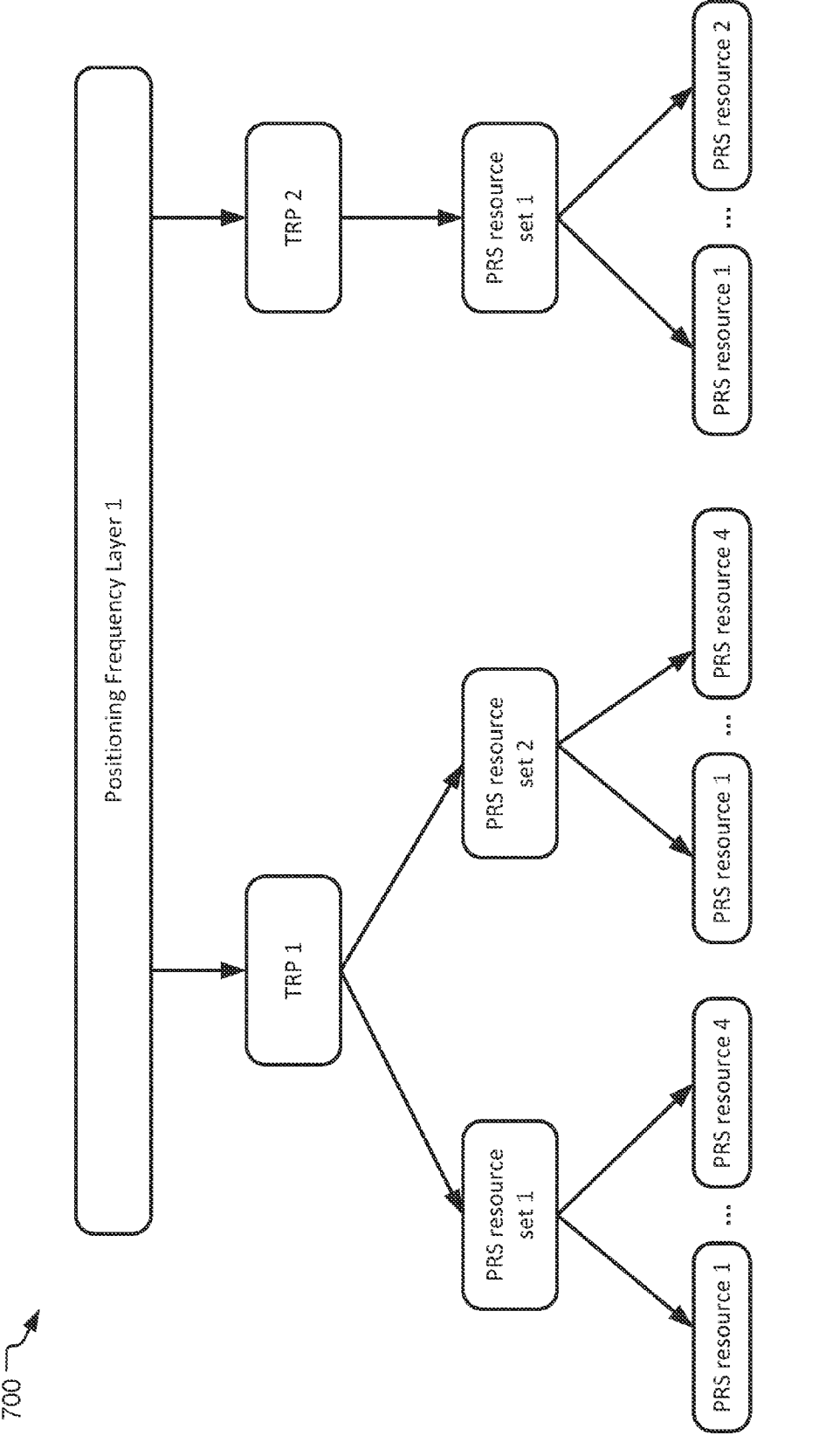
FIG. 7 is a conceptual diagram of an example positioning frequency layer.

Referring to FIG. 7, a conceptual diagram of an example positioning frequency layer 700 is shown. In an example, the positioning frequency layer 700 may be a collection of PRS resource sets across one or more TRPs. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS. Each of the PRS resource sets in the positioning frequency layer 700 is a collection of PRS resources across one TRP which have the same periodicity, a common muting pattern configuration, and the same repetition factor across slots.

Note that the terms positioning reference signal and PRS are reference signals that can be used for positioning, such as but not limited to, PRS signals, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

The ability of a UE to process PRS signals may vary based on the capabilities of the UE. In general, however, industry standards may be developed to establish a common PRS capability for UEs in a network. For example, an industry standard may require that a duration of DL PRS symbol in units of milliseconds (ms) a UE can process every T ms assuming a maximum DL PRS bandwidth in MHz, which is supported and reported by UE. As examples, and not limitations, the maximum DL PRS bandwidth for the FR1 bands may be 5, 10, 20, 40, 50, 80, 100 MHz, and for the FR2 bands may be 50, 100, 200, 400 MHz. The standards may also indicate a DL PRS buffering capability as a Type 1 (i.e., sub-slot/symbol level buffering), or a Type 2 (i.e., slot level buffering). The common UE capabilities may indicate a duration of DL PRS symbols N in units of ms a UE can process every T ms assuming maximum DL PRS bandwidth in MHz, which is supported and reported by a UE. Example T values may include 8, 16, 20, 30, 40, 80, 160, 320, 640, 1280 ms, and example N values may include 0.125, 0.25, 0.5, 1, 2, 4, 6, 8, 12, 16, 20, 25, 30, 32, 35, 40, 45, 50 ms. A UE may be configured to report a combination of (N. T) values per band, where N is a duration of DL PRS symbols in ms processed every T ms for a given maximum bandwidth (B) in MHz supported by a UE. In general, a UE may not be expected to support a DL PRS bandwidth that exceeds the reported DL PRS bandwidth value. The UE DL PRS processing capability may be defined for a single positioning frequency layer 700. The UE DL PRS processing capability may be agnostic to DL PRS comb factor configurations such as depicted in FIG. 6. The UE processing capability may indicate a maximum number of DL PRS resources that a UE can process in a slot under it. For example, the maximum number for FR1 bands may be 1, 2, 4, 6, 8, 12, 16, 24, 32, 48, 64 for each SCS: 15 kHz, 30 kHz, 60 kHz, and the maximum number for the FR2 bands may be 1, 2, 4, 6, 8, 12, 16, 24, 32, 48, 64 for each SCS: 15 kHz, 30 kHz, 60 kHz, 120 kHz.

Figure 8:
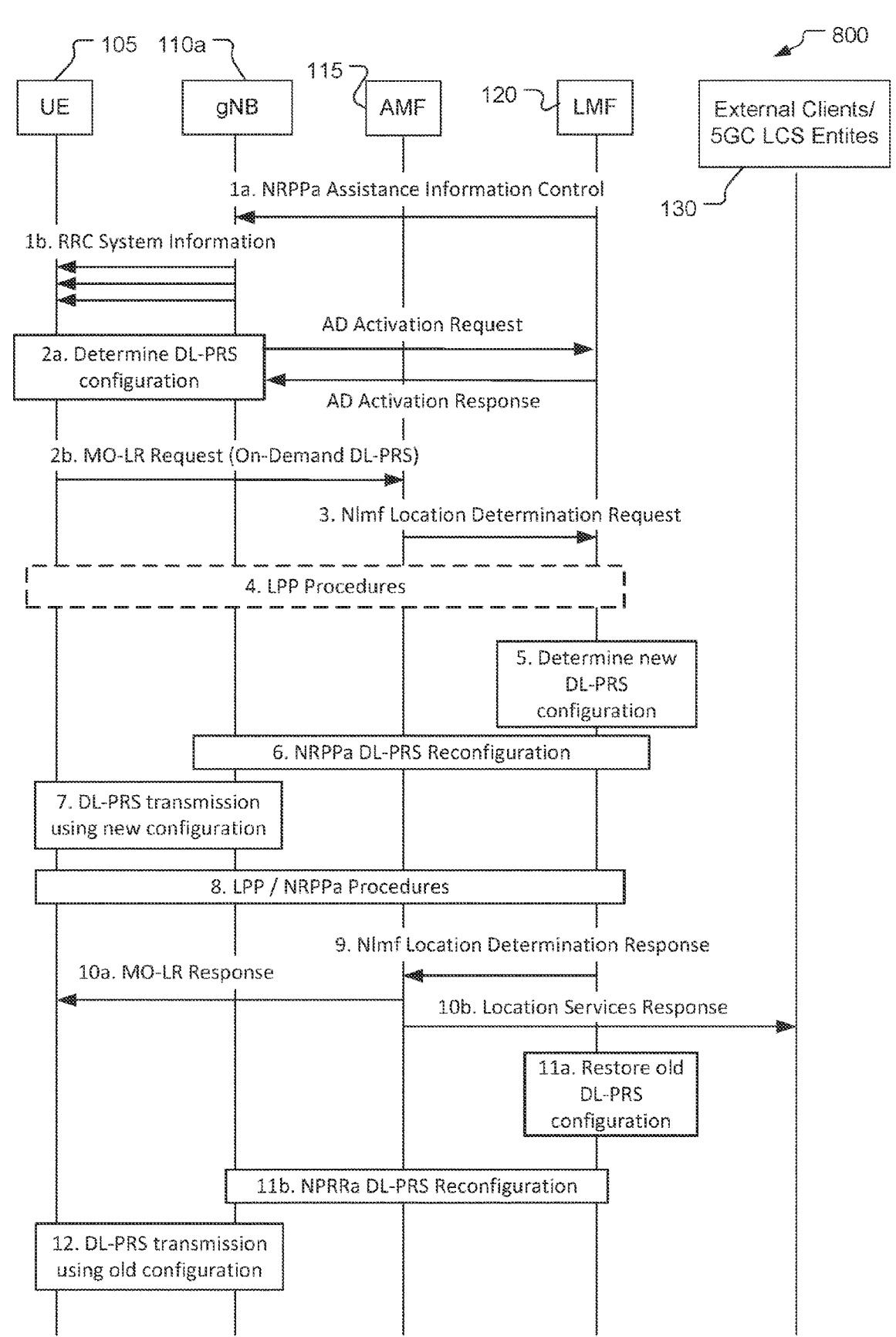
FIG. 8 is an example message flow diagram for an on-demand positioning reference signal procedure with multiple positioning configurations.

Referring to FIG. 8, an example message flow 800 for an on-demand DL-PRS procedure with multiple positioning configurations is shown. The example message flow 800 includes the UE 105 and an example TRP 300 such as the a gNB1 110*a*, and elements of the core network 140 such as the AMF 115, the LMF 120 and an external entity 130. The message flow 800 is an example, and not a limitation. In general, the message flow 800 may be used to extend existing mobile-originated location request (MO-LR) procedures for requesting assistance data (e.g., for DL-TDOA, DL-AoD or multi-RiT). For example, the UE 105 may be configured to request assistance data from the LMF 120 for UE assisted or UE based positioning using one or more of the positioning methods and may include additional parameters for indicating preferences for DL-PRS. The additional parameters may describe, for example, a desired PRS configuration and may include one or more of a preferred time or time period for the PRS configuration (e.g. current time, start time plus stop time), a preferred PRS resource bandwidth, a preferred duration of PRS positioning occasions, a preferred periodicity of the PRS positioning occasions, a preferred carrier frequency or frequency layer for the PRS resources, a preferred number and locations of gNBs/TRPs for which the PRS configuration around the UE location is requested, where the location of the gNBs/TRPs may be specified using a PCI or CGI, or as a specific location or a geographical region which may be expressed in absolute global coordinates or using a zone-identifier (e.g., similar to zone-ID used in NR Rel-16 Sidelink), or using coordinates relative to a known reference location (such as the location of a specific cell, such as the serving cell, provided to the UE in the assistance data), a preferred PRS beam direction or directions for individual gNBs, RSRP or RSRQ measurements performed by the UE on available DL signals (e.g., measurements for Radio Resource Management (RRM)), a Quality of Service (QoS) parameter describing the target location accuracy and latency (e.g., desired accuracy and response time for any location estimate based on PRS measurements (e.g., as requested by an UE internal client (e.g., an App))), and the PRS capabilities of the UE (e.g. as defined for LPP). Other parameters may also be used based on the configurations and capabilities of the respective gNBs and UEs.

Referring to the message flow 800, at steps 1*a* and 1*b* the LMF 120 may provide one or more positioning System Information Blocks (posSIBs) containing a set of possible on-demand DL-PRS configurations to the gNB 110*a* in an NRPPa Assistance Information Control message for broadcast in positioning System Information. The set of possible on-demand DL-PRS configurations may be bifurcated into two parts including a first part (e.g., Part 1) with a relatively small data payload including a high level description of the PRS configuration, and a second part (e.g., Part 2) including a relatively larger data payload with PRS configuration information elements and details. A small data payload requires less memory to store than a larger data payload (e.g., fewer bytes). In an example, Part 1 may be included in a master posSIB which may include definitions for a plurality of PRS configurations and scheduling information for the respective Part 2 information containing additional PRS configuration information elements. The Part 1 DL-PRS configuration information may include a unique identifier (e.g., a DL-PRS Configuration Identifier as depicted in FIG. 9), an identification of a positioning frequency layer (such as depicted in FIG. 7), subcarrier spacing (SCS) information, bandwidth information, a TRP identification, a resource set identification, resource identification, or other information to provide a general description of the PRS configuration. The Part 2 information may include the information elements such as comb size, cyclic prefix, number of symbols, etc. for a PRS configuration (e.g., some or all of the parameters listed in FIG. 9).

At step 2*a*, the UE 105 may be configured to determine a DL-PRS configuration based on the master posSIB received at step 1*b*. In an example, the UE 105 may receive the posSIBs broadcast at step 1*b* and read only the master posSIB to select one of the multiple PRS configurations based on the Part 1 information. The UE 105 may send an assistance data activation request to the LMF 120 based on the selected PRS configuration and receive a response confirming the request. The UE may then read a posSIB for the second part (e.g., Part 2) based on the scheduling information included in Part 1.

At step 2*b*, the UE 150 may be configured to send an MO-LR Request message included in an UL NAS TRANSPORT message to the serving AMF 115 including a request for on-demand DL-PRS transmission. The MO-LR request may include an LPP Request Assistance Data message defining the parameters for a selected DL-PRS configuration (e.g., Parts 1 and 2) determined at step 2*a*. The UE 105 may also request a DL-PRS configuration based on the DL-PRS parameters listed in FIG. 9 if none of the PRS configurations in the master posSIB are desired. The request may in addition include a LPP Provide Capabilities message including the DL-PRS capabilities of the UE 105, and a LPP Provide Location Information message (e.g., providing E-CID measurements).

In an embodiment, an external entity 130, or some entity in the 5GC (e.g. the GMLC 125) may request some location service (e.g. positioning) for the UE 105 to the serving AMF 115. Or, the serving AMF 115 for the UE 105 may be configured to determine a need for some location service (e.g. to locate the UE 105 for an emergency call). The LMF 120 or the AMF 115 may utilize a DL-PRS configuration previously requested by the UE 105 for the positioning session.

At step 3, the AMF 115 may be configured to invoke a Nlmf_Location_DetermineLocation service operation towards the LMF 120. The service operation may include the MO-LR Request from step 2*b*. At step 4, the LMF 120 may perform one or more LPP procedures (e.g., to obtain the DL-PRS positioning capabilities of the UE 105). At step 5, the LMF 120 may be configured to determine a new DL-PRS configuration for one or more gNBs (e.g., the gNB 110*a*) based on the request received at step 3. The determination at step 5 may also be based on location requests from and/or for other UEs nearby to the UE 105 which are received by the LMF 120 at about the same time.

At step 6, the LMF 120 may be configured to initiate a NRPPa DL-PRS Reconfiguration procedure with each of the gNBs determined at step 5. If some gNBs indicate that the new DL-PRS configuration cannot be supported, the LMF 120 may be configured to perform steps II to restore the old DL-PRS configurations in each of the gNBs which indicated a new DL-PRS configuration can be supported in order to avoid interference between gNBs which support the new DL-PRS configuration and gNBs which do not. In this case, the LMF 120 may provide the old DL-PRS configurations to the UE at step 8 instead of the new DL-PRS configurations.

At step 7, each of the gNBs (e.g., the gNB 110*a*) which acknowledged support of a new DL-PRS configuration at step 6 may be configured to change from an old DL-PRS configuration to a new DL-PRS configuration either after (or just before) sending the acknowledgment at step 6 if no start time was provided or at the start time indicated in step 6. In some cases, the old DL-PRS configuration may correspond to not transmitting a DL-PRS. At step 8, the LMF 120 may be configured to send an LPP Provide Assistance Data message to the UE 105 to provide the new DL-PRS configurations determined at step 5 and acknowledged at step 6. This message may also include the start time for each new DL-PRS configuration and a duration. If steps 2b or 2c were performed, the LMF 120 may initiate LPP and possibly NRPPa procedures to obtain the location of the UE 105.

At step 9, the LMF 120 may return an Nlmf_Location_DetermineLocation Response to the AMF 115. The message may indicate whether the DL-PRS Assistance Data was successfully transferred. At step 110a, the AMF 115 may forward the response from step 9 to the UE 105 via a MO-LR response. At step 110b, the AMF 115 may be configured to forward the response to the external clients 130/5GC LCS Entities.

At step 11, if a duration for the new DL-PRS was not included at step 6, the LMF 120 may be configured to initiate a NRPPa DL-PRS Reconfiguration procedure with each of the gNBs determined at step 5 to restore the old DL-PRS configuration for each gNB. At step 12, each of the gNBs may begin transmitting the old DL-PRS configuration either when the duration received in step 6 expires or after receiving and acknowledging the request to restore the old DL-PRS configuration at step 11. In some cases, the old DL-PRS configuration may correspond to not transmitting a DL-PRS.

Referring to FIG. 9, an example data structure 900 for requested DL-PRS configuration information is shown. The data structure 900 may be one or more tables and fields configured to be stored and transferred between network entities such as the LMF 120, gNB 110a, and UE 105. In an example, the parameters 902 may correspond to the PRS resources depicted in FIG. 7. In an embodiment, the on-demand DL-PRS procedures provided herein may utilize an Assistance Data Information Element (IE) which includes the parameters 902 as a set of possible DL-PRS configurations. In an embodiment, a master posSIB may include general descriptions of multiple PRS configurations including some of the parameters 902. For example, the general descriptions (e.g., the Part 1 information) may include an indication of the bandwidth, the subcarrier spacing, a TRP ID, a resource set ID, a resource ID, and periodicity information. Other PRS configuration information may also be included in the Part 1 information. The corresponding Part 2 information may include the remaining parameters 902. The list of parameters in the subset of parameters 904, 906 are examples and not limitations as other subsets may be used.

Referring to FIG. 10, with further reference to FIG. 9, an example data structure 1000 for broadcasting multiple positioning configurations is shown. The data structure includes an instance of a master posSIB 1002 including Part 1 information, and a plurality of posSIBs including Part 2 information. In an embodiment the plurality of posSIBs may include a first configuration posSIB 1004a, a second configuration posSIB 1004b, a third configuration posSIB 1004c, and a fourth configuration posSIB 1004d. The number and content of the posSIBs 1004a-d are examples as fewer or additional posSIBs may be used. In an example, a single posSIB may include configuration information for multiple PRS configurations (e.g., the first and second configuration posSIBS 1004a. 1004b may be included in a single posSIB). The posSIBs 1004a-d include the Part 2 configuration information previously described. For example, each of the posSIBS 1004a-d may have relatively larger data payloads as compared to the master posSIB 1002 which may include the respective parameters 902 for the PRS configurations identified in the master posSIB 1002. The UE 200 may be configured to generate one or more object instances for the master posSIB 1002 and the posSIBs 1004a-d in the memory 211 and decode a selected posSIB 1004a based on the scheduling information in the master posSIB 1002. The bifurcation of the PRS configuration data into the first and second parts (i.e., the master posSIB 1002 and the posSIBs 1004a-d) may reduce the decode errors and latency associated with PRS configuration broadcasts because a UE will not have to spend the processing cycles to receive and decode unneeded PRS configurations. In an embodiment, further segmentation of the PRS configuration parameters may also be required. For example, an individual posSIB 1004a-d may also include scheduling information for child posSIBs (not shown in FIG. 10) to extend the tree structure of FIG. 10 to additional branches and levels. Additional levels may also be used based on the size of the PRS configurations and the capacity of the data payloads (e.g., available information elements) of a network protocol.

Figure 11:
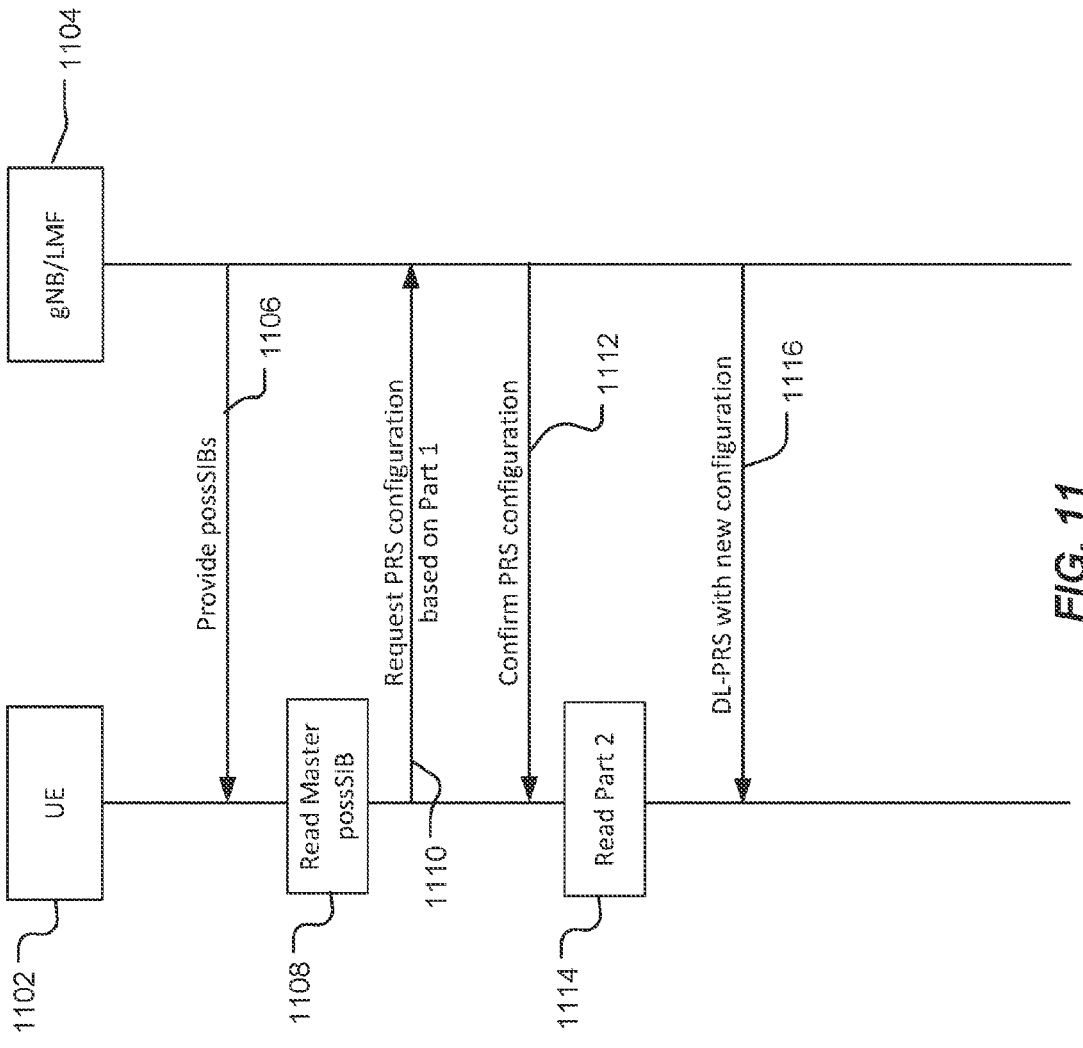
FIG. 11 is an example message flow for providing a positioning configuration.

Referring to FIG. 11, an example message flow 1100 for providing a positioning configuration is shown. The message flow 1100 includes a UE 1102 and a gNB 1104. The UE 1102 may include some or all of the components of the UE 200, and the UE 200 may be an example of the UE 1102. The gNB 1104 may include some or all of the components of the TRP 300, and the TRP 300 may be an example of the gNB 1104. In an example, the gNB 1104 may be communicatively coupled to a network server 400, such as the LMF 120. The message flow 1100 may utilized wired and wireless communication protocols and messaging such as LPP, NRPP, RRC, MAC-CE, DCI, Uu, PC5, and other signaling techniques as known in the art. In an embodiment, the message flow 1100 may be included in the message flow 800 as previously described. Other reference signal based positioning methods may also utilize one or more of the messages in the message flow 1100.

In operation, the gNB 1104 may provide positioning assistance data in one or more posSIBs messages 1106. The posSIBs messages 1106 may include a master posSIB, such as the posSIB 1002, and a plurality of configuration specific posSIBs, such as the posSIBs 1104a-d. At step 1108, the UE 1102 is configured to read the master posSIB to select a possible PRS configuration. The master posSIB includes high level details (e.g., the Part 1 information) for a plurality of PRS configurations, and the scheduling information for the configuration posSIBs (e.g., the Part 2 information). The selection of a PRS configuration may be based on the capabilities of the UE 1102, quality of service requirements, or other application specific rules. The UE 1102 may utilize the scheduling information to read the appropriate PRS configuration details. The UE 1102 may provide an assistance data activation request 110 for the selected PRS configuration based on the selection made at step 1108. The LMF may provide a confirmation message 1112 to the UE 1105 via the gNB 1104. Upon receiving the response from the LMF, the UE 1105 may read Part 2 of the selected configuration at step 1114. In an example, the UE 1105 may initiate the message flow 1100 in advance of a positioning session to reduce the change of delay in determine a position estimate. The gNB 1104 may transmit one or more PRS 1116 based on the selected PRS configuration.

The messages and steps in the message flow are examples and not limitations. Other messages and steps may be used to receive the part 1 and part 2 posSIB information. For example, the UE 1105 may receive the master posSIB and the PRS configurations may be transmitted in response to receiving an indication of the selected PRS configuration from the UE 1105. The master posSIB and configuration posSIBs may be included in a single SIB or in different combinations of SIBs. In an embodiment, one or more of the posSIBs may be received via a sidelink communication channel such as the Physical Sidelink Shared Channel (PSSCH), the Physical Sidelink Control Channel (PSCCH), the Physical Sidelink Broadcast Channel (PSBCH), and/or other sidelink channels. For example, in a V2X network, a Roadside Unit (RSU) may be configured to utilize the message flow 1100 to provide reference signal configuration information to a UE via the PC5 interface.

Referring to FIG. 12, with further reference to FIGS. 1-11, a method 1200 for measuring a positioning reference signal includes the stages shown. The method 1200 is, however, an example only and not limiting. The method 1200 may be altered, e.g., by having stages added, removed, rearranged, combined, performed concurrently, and/or having single stages split into multiple stages.

At stage 1202, the method includes receiving positioning assistance data including a first portion of a plurality of positioning reference signal configurations and scheduling information for a second portion of the plurality of positioning reference signal configurations. The UE 200, including the transceiver 215 and the processor 230, is a means for receiving the positioning assistance data. In an embodiment, a TRP 300, such as the gNB 110a, may be configured to broadcast the assistance data as one or more posSIBs such as described at steps 1a and 1b in the message flow 800 and posSIB messages 1106 in the message flow 1100. The posSIBs may include a master posSIB, such as the master posSIB 1002, which contains the first portion of the plurality of PRS configurations and the scheduling information for the second portion of the plurality of PRS configurations.

At stage 1204, the method includes selecting a first positioning reference signal configuration based on the first portion of the plurality of positioning reference signal configurations. The UE 200, including the processor 230, is a means for selecting the first PRS configuration. The positioning assistance data received at stage 1202 may include a master posSIB 1002, or other posSIBs, containing high level details for a plurality of possible PRS configurations. For example, the first portion of the PRS configurations may include a subset of the parameters 902 such as a unique identifier for a PRS, an identification of a positioning frequency layer, SCS information, bandwidth information, a TRP identification, a resource set identification, and/or a resource identification. The first portion of the PRS configuration may include other information to provide a general description of a PRS configuration to enable the UE 200 to select a configuration. The PRS configuration selection may be based on the physical and electrical capabilities of the UE 200 (e.g., bandwidth, frequency range), and/or other application and operational considerations.

At stage 1206, the method includes obtaining a plurality of positioning reference signal parameters associated with the first positioning reference signal configuration based on the scheduling information, wherein the plurality of positioning reference signal parameters are included in the second portion of the plurality of positioning reference signal configurations. The UE 200, including the transceiver 215 and the processor 230, is a means for obtaining the plurality of positioning reference signal parameters. The assistance data received at stage 1202 includes the scheduling information for one or more additional possSIBs associated with the PRS configuration options. For example, the PRS parameters associated with the first PRS information may be included in posSIBs, such as the posSIBs 1004a-d, and indexed based on scheduling information. The scheduling information may include times, frames, subframes, slots, symbols, or other indices associated with PRS configuration parameters. The second portion of the plurality of the PRS configurations may include the parameters 902 and may be included in one or posSIBs received by the UE 200.

At stage 1208, the method includes measuring one or more positioning reference signals, the one or more positioning reference signals being based at least in part on the plurality of positioning reference signal parameters. The UE 200, including the transceiver 215 and the processor 230, is a means for measuring one or more PRSs. The first PRS configuration may include the configuration information included in the master posSIB 1002 (e.g., the Part 1 information), and the plurality of positioning reference signal parameters includes the parameters 902 in the respective posSIB (e.g., one of the posSIBs 1004a-d). The UE 200 may be configured to utilize the PRS configuration information to obtain location measurements (e.g., measurements of RSSI, RTT, Rx-Tx Time Difference, RSRP, RSRQ or Time Of Arrival (TOA) for signals transmitted by one or more TRPs 300. In an example, the UE 200 may send the measurements to a location server (e.g., the LMF 120) for computation of a location estimate for the UE 200.

Referring to FIG. 13, with further reference to FIGS. 1-11, a method 1300 for transmitting positioning reference signals includes the stages shown. The method 1300 is, however, an example only and not limiting. The method 1300 may be altered, e.g., by having stages added, removed, rearranged, combined, performed concurrently, and/or having single stages split into multiple stages.

At stage 1302, the method includes transmitting positioning assistance data including a first portion of a plurality of positioning reference signal configurations and scheduling information for a second portion of the plurality of positioning reference signal configurations. A TRP 300, including a transceiver 315 and a processor 310, is a means for transmitting the position assistance data. In an embodiment, a TRP 300, such as the gNB 110a, may be configured to broadcast the assistance data as one or more posSIBs such as described at steps 1a and 1b in the message flow 800 and posSIB messages 1106 in the message flow 1100. The posSIBs may include a master posSIB, such as the master posSIB 1002, which contains the first portion of the plurality of PRS configurations and the scheduling information for the second portion of the plurality of PRS configurations. The positioning assistance data may also include one or more posssSIBs including detailed PRS configuration information, such as the possSIBs 1004a-d.

At stage 1304, the method includes receiving a positioning reference signal configuration request from a wireless node, wherein the positioning reference signal configuration request is associated with a first set of parameters included in the first portion of the plurality of positioning reference signal configurations. The TRP 300, including a transceiver 315 and a processor 310, is a means for receiving a PRS configuration request. In an embodiment, referring to FIG. 11, the UE 1102 may be configured to select a PRS configuration at step 1108, and then transmit a PRS configuration request message 110 to the gNB 104 and/or the LMF 120. The PRS configuration request may be associated one of the PRS configurations in the master posSIB 1002, and the TRP 300 may be configured to determine the PRS configuration parameters 902 based on the PRS configuration request message 110. In an example, the PRS configuration request message may include a DL-PRS configuration identifier that is associated with a set of parameters 902. In an embodiment, the PRS configuration request may be included in a MO-LR request for an on-demand DL-PRS.

At stage 1306, the method includes determining a second set of parameters included in the second portion of the plurality of positioning reference signal configurations based on the positioning reference signal request. The TRP 300, including a transceiver 315 and a processor 310, is a means for determining the second set of parameters. The second set of parameters may correspond to the parameters 902 associated with the PRS configuration identified in the PRS configuration request received at stage 1304. In an embodiment, the second set of parameters may be based on broadcasted assistance data such as the possSIBs 1004*a-d*. In an example, referring to FIG. 8, the TRP 300 may be the gNB 110*a* and configured to determine the second set of parameters based on a NRPPa DL-PRS reconfiguration procedure at step 6.

At stage 1308, the method includes transmitting one or more positioning reference signals based at least in part on the second set of parameters. The TRP 300, including a transceiver 315 and a processor 310, is a means for transmitting the PRS. Referring to FIG. 8, the second set of parameters correspond to the PRS parameters 902 included in one of the possSIBs 1004*a-d* decoded by the UE 105. Thus, the UE 105 will be configured to measure the one or more transmitted PRS at step 7 in the message flow 800.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different disclosures and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for measuring a positioning reference signal, comprising: receiving positioning assistance data including a first portion of a plurality of positioning reference signal configurations and scheduling information for a second portion of the plurality of positioning reference signal configurations; selecting a first positioning reference signal configuration based on the first portion of the plurality of positioning reference signal configurations; obtaining a plurality of positioning reference signal parameters associated with the first positioning reference signal configuration based on the scheduling information, wherein the plurality of positioning reference signal parameters are included in the second portion of the plurality of positioning reference signal configurations; and measuring one or more positioning reference signals, the one or more positioning reference signals being based at least in part on the plurality of positioning reference signal parameters.

Clause 2. The method of clause 1 wherein the positioning assistance data including the first portion of the plurality of positioning reference signal configurations and the scheduling information for the second portion of the plurality of positioning reference signal configurations is included in a system information block in one or more radio resource control messages.

Clause 3. The method of clause 1 wherein the plurality of positioning reference signal parameters are included in one or more system information blocks in one or more radio resource control messages.

Clause 4. The method of clause 1 wherein the plurality of positioning reference signal parameters associated with one of the plurality of positioning reference signal configurations are included in one system information block in one or more radio resource control messages.

Clause 5. The method of clause 1 wherein a data payload for the first portion of the plurality of positioning reference signal configurations and the scheduling information is less than a data payload for the plurality of positioning reference signal parameters.

Clause 6. The method of clause 1 wherein the first portion of the plurality of positioning reference signal configurations includes a bandwidth value and a subcarrier spacing value for each of the plurality of positioning reference signal configurations.

Clause 7. The method of clause 1 further comprising transmitting an on-demand positioning reference signal request based on the first positioning reference signal configuration.

Clause 8. The method of clause 7 wherein the on-demand positioning reference signal request is included in a mobile-originated location request.

Clause 9. The method of clause 1 wherein measuring the one or more positioning reference signals includes determining one or more of a Received Signal Strength Indication (RSSI), a Round Trip signal propagation Time (RTT), a Reference Signal Iime Difference (RSTD), a Receive-minus-Transmit Time Difference (Rx-Tx Time Difference), a Reference Signal Received Power (RSRP), and a Reference Signal Received Quality (RSRQ) based on the one or more positioning reference signals.

Clause 10. A method for transmitting positioning reference signals, comprising: transmitting positioning assistance data including a first portion of a plurality of positioning reference signal configurations and scheduling information for a second portion of the plurality of positioning reference signal configurations: receiving a positioning reference signal configuration request from a wireless node, wherein the positioning reference signal configuration request is associated with a first set of parameters included in the first portion of the plurality of positioning reference signal configurations; determining a second set of parameters included in the second portion of the plurality of positioning reference signal configurations based on the positioning reference signal configuration request; and transmitting one or more positioning reference signals based at least in part on the second set of parameters.

Clause 11. The method of clause 10 wherein transmitting the positioning assistance data includes transmitting a plurality of system information blocks in one or more radio resource control messages.

Clause 12. The method of clause 11 wherein the first portion of the plurality of positioning reference signal configurations and the scheduling information are included in a single system information block.

Clause 13. The method of clause 11 wherein at least one of the plurality of system information blocks includes the second set of parameters.

Clause 14. The method of clause 11 wherein the second set of parameters are included in the plurality of system information blocks.

Clause 15. The method of clause 11 wherein the first portion of the plurality of positioning reference signal configurations includes a bandwidth value and a subcarrier spacing value for each of the plurality of positioning reference signal configurations.

Clause 16. The method of clause 10 wherein the positioning reference signal configuration request is an on-demand positioning reference signal request.

Clause 17. The method of clause 16 wherein the on-demand positioning reference signal request is included in a mobile-originated location request.

Clause 18. An apparatus, comprising: a memory; at least one transceiver; at least one processor communicatively coupled to the memory and the at least one transceiver, and configured to: receive positioning assistance data including a first portion of a plurality of positioning reference signal configurations and scheduling information for a second portion of the plurality of positioning reference signal configurations; select a first positioning reference signal configuration based on the first portion of the plurality of positioning reference signal configurations; obtain a plurality of positioning reference signal parameters associated with the first positioning reference signal configuration based on the scheduling information, wherein the plurality of positioning reference signal parameters are included in the second portion of the plurality of positioning reference signal configurations; and measure one or more positioning reference signals, the one or more positioning reference signals being based at least in part on the plurality of positioning reference signal parameters.

Clause 19. The apparatus of clause 18 wherein the positioning assistance data including the first portion of the plurality of positioning reference signal configurations and the scheduling information for the second portion of the plurality of positioning reference signal configurations is included in a system information block in one or more radio resource control messages.

Clause 20. The apparatus of clause 18 wherein the plurality of positioning reference signal parameters are included in one or more system information blocks in one or more radio resource control messages.

Clause 21. The apparatus of clause 18 wherein the plurality of positioning reference signal parameters associated with one of the plurality of positioning reference signal configurations are included in one system information block in one or more radio resource control messages.

Clause 22. The apparatus of clause 18 wherein a data payload for the first portion of the plurality of positioning reference signal configurations and the scheduling information is less than a data payload for the plurality of positioning reference signal parameters.

Clause 23. The apparatus of clause 18 wherein the first portion of the plurality of positioning reference signal configurations includes a bandwidth value and a subcarrier spacing value for each of the plurality of positioning reference signal configurations.

Clause 24. The apparatus of clause 18 wherein the at least one processor is further configured to transmit an on-demand positioning reference signal request based on the first positioning reference signal configuration.

Clause 25. The apparatus of clause 24 wherein the on-demand positioning reference signal request is included in a mobile-originated location request.

Clause 26. The apparatus of clause 18 wherein the at least one processor is further configured to determine one or more of a Received Signal Strength Indication (RSSI), a Round Trip signal propagation Time (RTT), a Reference Signal Time Difference (RSTD), a Receive-minus-Transmit Time Difference (Rx-Tx Time Difference), a Reference Signal Received Power (RSRP), and a Reference Signal Received Quality (RSRQ) based on the one or more positioning reference signals.

Clause 27. An apparatus, comprising: a memory; at least one transceiver; at least one processor communicatively coupled to the memory and the at least one transceiver, and configured to: transmit positioning assistance data including a first portion of a plurality of positioning reference signal configurations and scheduling information for a second portion of the plurality of positioning reference signal configurations; receive a positioning reference signal configuration request from a wireless node, wherein the positioning reference signal configuration request is associated with a first set of parameters included in the first portion of the plurality of positioning reference signal configurations; determine a second set of parameters included in the second portion of the plurality of positioning reference signal configurations based on the positioning reference signal configuration request; and transmit one or more positioning reference signals based at least in part on the second set of parameters.

Clause 28. The apparatus of clause 27 wherein the at least one processor is further configured to transmit a plurality of system information blocks in one or more radio resource control messages.

Clause 29. The apparatus of clause 28 wherein the first portion of the plurality of positioning reference signal configurations and the scheduling information are included in a single system information block.

Clause 30. The apparatus of clause 28 wherein at least one of the plurality of system information blocks includes the second set of parameters.

Clause 31. The apparatus of clause 28 wherein the second set of parameters are included in the plurality of system information blocks.

Clause 32. The apparatus of clause 28 wherein the first portion of the plurality of positioning reference signal configurations includes a bandwidth value and a subcarrier spacing value for each of the plurality of positioning reference signal configurations.

Clause 33. The apparatus of clause 27 wherein the positioning reference signal configuration request is an on-demand positioning reference signal request.

Clause 34. The apparatus of clause 33 wherein the on-demand positioning reference signal request is included in a mobile-originated location request.

Clause 35. An apparatus for measuring a positioning reference signal, comprising: means for receiving positioning assistance data including a first portion of a plurality of positioning reference signal configurations and scheduling information for a second portion of the plurality of positioning reference signal configurations; means for selecting a first positioning reference signal configuration based on the first portion of the plurality of positioning reference signal configurations; means for obtaining a plurality of positioning reference signal parameters associated with the first positioning reference signal configuration based on the scheduling information, wherein the plurality of positioning reference signal parameters are included in the second portion of the plurality of positioning reference signal configurations; and means for measuring one or more positioning reference signals, the one or more positioning reference signals being based at least in part on the plurality of positioning reference signal parameters.

Clause 36. An apparatus for transmitting positioning reference signals, comprising: means for transmitting positioning assistance data including a first portion of a plurality of positioning reference signal configurations and scheduling information for a second portion of the plurality of positioning reference signal configurations; means for receiving a positioning reference signal configuration request from a wireless node, wherein the positioning reference signal configuration request is associated with a first set of parameters included in the first portion of the plurality of positioning reference signal configurations; means for determining a second set of parameters included in the second portion of the plurality of positioning reference signal configurations based on the positioning reference signal configuration request; and means for transmitting one or more positioning reference signals based at least in part on the second set of parameters.

Clause 37. A non-transitory processor-readable storage medium comprising processor-readable instructions configured to cause one or more processors to measure a positioning reference signal, comprising: code for receiving positioning assistance data including a first portion of a plurality of positioning reference signal configurations and scheduling information for a second portion of the plurality of positioning reference signal configurations; code for selecting a first positioning reference signal configuration based on the first portion of the plurality of positioning reference signal configurations; code for obtaining a plurality of positioning reference signal parameters associated with the first positioning reference signal configuration based on the scheduling information, wherein the plurality of positioning reference signal parameters are included in the second portion of the plurality of positioning reference signal configurations: and code for measuring one or more positioning reference signals, the one or more positioning reference signals being based at least in part on the plurality of positioning reference signal parameters.

Clause 38. A non-transitory processor-readable storage medium comprising processor-readable instructions configured to cause one or more processors to transmit positioning reference signals, comprising: code for transmitting positioning assistance data including a first portion of a plurality of positioning reference signal configurations and scheduling information for a second portion of the plurality of positioning reference signal configurations; code for receiving a positioning reference signal configuration request from a wireless node, wherein the positioning reference signal configuration request is associated with a first set of parameters included in the first portion of the plurality of positioning reference signal configurations; code for determining a second set of parameters included in the second portion of the plurality of positioning reference signal configurations based on the positioning reference signal configuration request: and code for transmitting one or more positioning reference signals based at least in part on the second set of parameters.

The invention claimed is:

1. A method for measuring a positioning reference signal, comprising:

receiving positioning assistance data including a first portion of a plurality of positioning reference signal configurations and scheduling information for a second portion of the plurality of positioning reference signal configurations;

selecting a first positioning reference signal configuration based on the first portion of the plurality of positioning reference signal configurations;

obtaining a plurality of positioning reference signal parameters associated with the first positioning reference signal configuration based on the scheduling information, wherein the plurality of positioning reference signal parameters are included in the second portion of the plurality of positioning reference signal configurations; and measuring one or more positioning reference signals, the one or more positioning reference signals being based at least in part on the plurality of positioning reference signal parameters.

2. The method of claim 1 wherein the positioning assistance data including the first portion of the plurality of positioning reference signal configurations and the scheduling information for the second portion of the plurality of positioning reference signal configurations is included in a system information block in one or more radio resource control messages.

3. The method of claim 1 wherein the plurality of positioning reference signal parameters are included in one or more system information blocks in one or more radio resource control messages.

4. The method of claim 1 wherein the plurality of positioning reference signal parameters associated with one of the plurality of positioning reference signal configurations are included in one system information block in one or more radio resource control messages.

5. The method of claim 1 wherein a data payload for the first portion of the plurality of positioning reference signal configurations and the scheduling information is less than a data payload for the plurality of positioning reference signal parameters.

6. The method of claim 1 wherein the first portion of the plurality of positioning reference signal configurations includes a bandwidth value and a subcarrier spacing value for each of the plurality of positioning reference signal configurations.

7. The method of claim 1 further comprising transmitting an on-demand positioning reference signal request based on the first positioning reference signal configuration.

8. The method of claim 7 wherein the on-demand positioning reference signal request is included in a mobile-originated location request.

9. The method of claim 1 wherein measuring the one or more positioning reference signals includes determining one or more of a Received Signal Strength Indication (RSSI), a Round Trip signal propagation Time (RTT), a Reference Signal Time Difference (RSTD), a Receive-minus-Transmit Time Difference (Rx-Tx Time Difference), a Reference Signal Received Power (RSRP), and a Reference Signal Received Quality (RSRQ) based on the one or more positioning reference signals.

10. A method for transmitting positioning reference signals, comprising:

transmitting positioning assistance data including a first portion of a plurality of positioning reference signal configurations and scheduling information for a second portion of the plurality of positioning reference signal configurations;

receiving a positioning reference signal configuration request from a wireless node, wherein the positioning reference signal configuration request is associated with a first set of parameters included in the first portion of the plurality of positioning reference signal configurations;

determining a second set of parameters included in the second portion of the plurality of positioning reference signal configurations based on the positioning reference signal configuration request; and transmitting one or more positioning reference signals based at least in part on the second set of parameters.

11. The method of claim 10 wherein transmitting the positioning assistance data includes transmitting a plurality of system information blocks in one or more radio resource control messages.

12. The method of claim 11 wherein the first portion of the plurality of positioning reference signal configurations and the scheduling information are included in a single system information block.

13. The method of claim 11 wherein at least one of the plurality of system information blocks includes the second set of parameters.

14. The method of claim 11 wherein the second set of parameters are included in the plurality of system information blocks.

15. The method of claim 11 wherein the first portion of the plurality of positioning reference signal configurations includes a bandwidth value and a subcarrier spacing value for each of the plurality of positioning reference signal configurations.

16. The method of claim 10 wherein the positioning reference signal configuration request is an on-demand positioning reference signal request.

17. The method of claim 16 wherein the on-demand positioning reference signal request is included in a mobile-originated location request.

18. An apparatus, comprising:
a memory;
at least one transceiver;
at least one processor communicatively coupled to the memory and the at least one transceiver, and configured to:
  receive positioning assistance data including a first portion of a plurality of positioning reference signal configurations and scheduling information for a second portion of the plurality of positioning reference signal configurations;
  select a first positioning reference signal configuration based on the first portion of the plurality of positioning reference signal configurations;
  obtain a plurality of positioning reference signal parameters associated with the first positioning reference signal configuration based on the scheduling information, wherein the plurality of positioning reference signal parameters are included in the second portion of the plurality of positioning reference signal configurations; and
  measure one or more positioning reference signals, the one or more positioning reference signals being based at least in part on the plurality of positioning reference signal parameters.

19. The apparatus of claim 18 wherein the positioning assistance data including the first portion of the plurality of positioning reference signal configurations and the scheduling information for the second portion of the plurality of positioning reference signal configurations is included in a system information block in one or more radio resource control messages.

20. The apparatus of claim 18 wherein the plurality of positioning reference signal parameters are included in one or more system information blocks in one or more radio resource control messages.

21. The apparatus of claim 18 wherein the plurality of positioning reference signal parameters associated with one of the plurality of positioning reference signal configurations are included in one system information block in one or more radio resource control messages.

22. The apparatus of claim 18 wherein a data payload for the first portion of the plurality of positioning reference signal configurations and the scheduling information is less than a data payload for the plurality of positioning reference signal parameters.

23. The apparatus of claim 18 wherein the first portion of the plurality of positioning reference signal configurations includes a bandwidth value and a subcarrier spacing value for each of the plurality of positioning reference signal configurations.

24. The apparatus of claim 18 wherein the at least one processor is further configured to transmit an on-demand positioning reference signal request based on the first positioning reference signal configuration.

25. The apparatus of claim 24 wherein the on-demand positioning reference signal request is included in a mobile-originated location request.

26. The apparatus of claim 18 wherein the at least one processor is further configured to determine one or more of a Received Signal Strength Indication (RSSI), a Round Trip signal propagation Time (RTT), a Reference Signal Time Difference (RSTD), a Receive-minus-Transmit Time Difference (Rx-Tx Time Difference), a Reference Signal Received Power (RSRP), and a Reference Signal Received Quality (RSRQ) based on the one or more positioning reference signals.

27. An apparatus, comprising:
a memory;
at least one transceiver;
at least one processor communicatively coupled to the memory and the at least one transceiver, and configured to:
  transmit positioning assistance data including a first portion of a plurality of positioning reference signal configurations and scheduling information for a second portion of the plurality of positioning reference signal configurations;
  receive a positioning reference signal configuration request from a wireless node, wherein the positioning reference signal configuration request is associated with a first set of parameters included in the first portion of the plurality of positioning reference signal configurations;
  determine a second set of parameters included in the second portion of the plurality of positioning reference signal configurations based on the positioning reference signal configuration request; and
  transmit one or more positioning reference signals based at least in part on the second set of parameters.

28. The apparatus of claim 27 wherein the at least one processor is further configured to transmit a plurality of system information blocks in one or more radio resource control messages.

29. The apparatus of claim 28 wherein the first portion of the plurality of positioning reference signal configurations and the scheduling information are included in a single system information block.

30. The apparatus of claim 28 wherein the second set of parameters are included in one or more system information blocks in the plurality of system information blocks.

* * * * *